United States Patent
El-Alfy et al.

(10) Patent No.: US 10,848,448 B2
(45) Date of Patent: Nov. 24, 2020

(54) SPAM FILTERING IN MULTIMODAL MOBILE COMMUNICATION

(71) Applicant: King Fahd University of Petroleum and Minerals, Dhahran (SA)

(72) Inventors: El-Sayed M. El-Alfy, Dhahran (SA); Ali A. Al-Hasan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/711,032

(22) Filed: Sep. 21, 2017

(65) Prior Publication Data

US 2018/0083903 A1 Mar. 22, 2018

Related U.S. Application Data

(60) Provisional application No. 62/397,564, filed on Sep. 21, 2016.

(51) Int. Cl.
*G06F 15/16* (2006.01)
*H04L 12/58* (2006.01)
(Continued)

(52) U.S. Cl.
CPC ............ *H04L 51/12* (2013.01); *G06F 21/563* (2013.01); *G06N 7/005* (2013.01); *G06N 20/10* (2019.01);
(Continued)

(58) Field of Classification Search
CPC ..... H04L 51/12; H04L 63/0227; H04L 63/14; H04L 63/1441; H04L 63/145;
(Continued)

(56) References Cited

U.S. PATENT DOCUMENTS

| | | | |
|---|---|---|---|
| 2005/0080860 A1* | 4/2005 | Daniell ................ | G06Q 10/107 709/206 |
| 2010/0004930 A1* | 1/2010 | Strope .................... | G10L 15/32 704/240 |

(Continued)

OTHER PUBLICATIONS

Title: A novel bio-inspired predictive model for spam filtering based on dendritic cell algorithm Author: El-Sayed M. El-Alfy, Ali A. Al-Hasan Date of Conference: Dec. 9-12, 2014 , Date Added to IEEE Xplore: Jan. 19, 2015.*

(Continued)

*Primary Examiner* — Brian Whipple
*Assistant Examiner* — Hannah S Wang
(74) *Attorney, Agent, or Firm* — Oblon, McClelland, Maier & Neustadt, L.L.P.

(57) ABSTRACT

A method for filtering multimodal messages includes receiving an electronic message; enriching the electronic message; extracting one or more features from the electronic message; generating, one or more dendritic cell signals based on the one or more features extracted from the electronic message; subjecting the one or more dendritic cell signals and the electronic message to a dendritic cell algorithm including one or more dendritic cells; determining a maturity of the one or more dendritic cells; and classifying the electronic message as spam based upon the maturity of the one or more dendritic cells.

17 Claims, 7 Drawing Sheets

(51) Int. Cl.

| | |
|---|---|
| G06F 21/56 | (2013.01) |
| H04L 29/06 | (2006.01) |
| H04W 4/14 | (2009.01) |
| G06N 7/00 | (2006.01) |
| G06N 20/10 | (2019.01) |
| G06N 20/20 | (2019.01) |
| H04W 88/18 | (2009.01) |

(52) U.S. Cl.
CPC ......... *G06N 20/20* (2019.01); *H04L 63/0227* (2013.01); *H04L 63/14* (2013.01); *H04W 4/14* (2013.01); *H04L 51/38* (2013.01); *H04W 88/184* (2013.01)

(58) Field of Classification Search
CPC . H04L 63/1425; H04L 63/1416; H04L 67/10; G06F 21/563; G06F 21/56; H04W 4/14
USPC .......................................................... 709/206
See application file for complete search history.

(56) References Cited

U.S. PATENT DOCUMENTS

| | | | | |
|---|---|---|---|---|
| 2015/0074802 | A1* | 3/2015 | Sanjeev | ................ G06F 21/55 726/22 |
| 2016/0021125 | A1 | 1/2016 | Handel et al. | |
| 2016/0094580 | A1 | 3/2016 | Handel et al. | |
| 2017/0192955 | A1* | 7/2017 | Zeichner | ............... G06F 16/335 |

OTHER PUBLICATIONS

Title: Text mining and probabilistic language modeling for online review spam detection Author: S. Y. Liao, Ron Chi-Wai Kwok, Kaiquan Xu, Yunqing Xia, Yuefeng Li Date: Dec. 2011.*

Title: Dendritic Cell Algorithm for Mobile Phone Spam Filtering Author: Ali A. Al-Hasana , El-Sayed M. El-Alfy Conference date: Jun. 2-5, 2015, Date created: Jun. 2, 2015, Date modified: Jun. 2, 2015.*

Title: Identification of SPAM messages using an approach inspired on the immune system Author: T.S. Guzella T.A. Mota-Santos J.Q. Uchoa W.M. Caminhas Date: 2008.*

El-Sayed M. El-Alfy et al., "Spam filtering framework for multimodal mobile communication based on dendritic cell algorithm," Future Generation Computer Systems, vol. 64, 2016, pp. 98-107.

Ali A. Al-Hasana et al., "Dendritic Cell Algorithm for Mobile Phone Spam Filtering," Procedia Computer Science, 2015, 8 Pages.

Julia Greensmith et al., "Detecting Danger: The Dendritic Cell Algorithm," HP Laboratories, 27 Pages.

Gordon V. Cormack et al., "Spam Flitering for Short Messages," 8 Pages.

Sarah Jane Delany et al., "SMS Spam Filtering: Methods and Data," Expert Systems with Applications, vol. 39, No. 10, 2012, 33 Pages.

José María Gómez Hidalgo et al., "Content Based SMS Spam Filtering," 8 Pages.

Dae-Neung Sohn et al., "Content-based mobile spam classification using stylistically motivated features," Pattern Recognition Letters, vol. 33, 2012, pp. 364-369.

Aakanksha Sharaff et al., "Comparative Study of Classification Algorithms for Spam Email Detection," Emerging Research in Computing, Information, Communication and Applications, 2016, 8 Pages.

Chih-Chin Lai, "An empirical study of three machine learning methods for spam filtering," Knowledge-Based Systems, vol. 20, 2007, pp. 249-254.

Bo Yu et al., "A comparative study for content-based dynamic spam classification using four machine learning algorithms," Knowledge-Based Systems, vol. 21, 2008, pp. 355-362.

Daniel V. Nh et al., "Android Malware Detection Using the Dendritic Cell Algorithm," 2014, 6 Pages.

Kamahazira Zainal et al., "The Design and Development of Spam Risk Assessment Prototype: In Silico Danger Theory Variants," International Journal of Advanced Computer Science and Applications, vol. 5, No. 4, 2017, pp. 401-410.

Tarek M Mahmoud et al., "SMS Spam Filtering Technique Based on Artificial Immune System," International Journal of Computer Science Issues, vol. 9, Issue 2, No. 1, Mar. 2012, pp. 589-597.

Neha Singh et al., "Dendritic Cell Algorithm and Dempster Belief Theory Using Improved Intrusion Detection System," International Journal of Advanced Research in Computer Science and Software Engineering, vol. 3, Issue 7, Jul. 2013, pp. 699-703.

El-Sayed M. El-Alfy et al., "A Novel Bio-Inspired Predictive Model for Spam Filtering Based on Dendritic Cell Algorithm," 7 Pages.

\* cited by examiner

Fig. 2

SPAM FILTERING IN MULTIMODAL MOBILE COMMUNICATION

INCORPORATION BY REFERENCE

This present disclosure claims the benefit of U.S. Provisional Application No. 62/397,564, "System And Method For Spam Filtering In Multimodal Mobile Communication" filed on Sep. 21, 2016, which is incorporated herein by reference in its entirety.

BACKGROUND

The present disclosure relates to spam filtering of electronic messages based on the dendritic cell algorithm.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In the past decade, mobile technology applications have witnessed a boom in interest from researchers and developers. The number of mobile users has drastically increased with almost seven billion cellular subscriptions worldwide at the current time. See B. Sanou, The world in 2014: ICT facts and figures, 2014. https://www.inu.int/en/ITU-D/Statistics/Documents/facts.ICTFactsFigures2014-e.pdf., incorporated herein by reference in its entirety. Many mobile applications have emerged with support for new features in addition to normal phone communication. Mobile devices such as smartphones, tablets, and PDAs are now used for most daily activities such as web browsing, entertainment, mobile payment, accessing medical records, accessing personal records, banking, and learning.

Mobile devices also enable a plethora of textual communication modes (multimodal) which provide convenience for most personal and business purposes. These modes include, but are not limited to, electronic mails, short messages in the form of an IM (Instant Messaging), and short messages in the form of an SMS (Short Messaging Service). One concern of such great technologies is the alarming rates of spam messages. For instance, according to Symantec the global rate of spam in email traffic in 2014 was 60%. See S. Corporation, Internet security threat report, volume 20, https://www4.symantec.com/mktginfo/whitepaper/ISTR/24347932_GA-Internet-security-threat-report-volume-20-2015-social_v2.pdf, 2015, incorporated herein by reference in its entirety. Spam may contain not only irritating content to end-users, such as unwanted adult material, but it can also waste a lot of resources and become a vector for security breaches.

Unlike desktop applications, effective security controls to protect mobile devices are not so mature. This can be attributed to limited resources and processing power, as well as the lack of knowledge and awareness of many end-users regarding security controls. Moreover, mobile devices are likely to contain personal and confidential information such as credit card numbers, contact lists, emails, medical records, and other sensitive documents. These reasons and more are making mobile devices more attractive to cyber-attacks, and spam can be the easiest way for targeted attacks. Spam or unsolicited messages can be used for phishing and as a vehicle for other malware types such as worms, backdoors, and key loggers. The risks associated with spam can be operational loss and/or financial loss. Hackers can utilize the compromised mobile devices to make calls to premium numbers without the permission of the user/owner of the mobile device, steal contact data, or participle in fraudulent and botnet activities.

The future of mobile technologies includes a greater emphasis on security-related issues. Besides reporting spam to service providers and carriers, spam filters should be deployed at the receiving end to directly block unwanted messages. Other mitigation techniques include white and black listing and challenge response. Content-based filtering has received considerable attention, but the focus was on spam emails. Recently, some methods have been proposed for SMS spam. See T. A. Almeida, J. M. G. Hidalgo, A. Yamakami, Contributions to the study of SMS spam filtering: new collection and results, in: Proceedings of the 11th ACM Symposium on Document Engineering, 2011, pp. 259-262; G. V. Cormack, J. M. Gómez Hidalgo, E. P. Sánz, Spam filtering for short messages, in: Proceedings of the 16th ACM Conference on Information and Knowledge Management, 2007, pp. 313-320; S. J. Delany, M. Buckley, D. Greene, SMS spam filtering: methods and data, Expert Systems with Applications 39 (2012) 9899-9908; J. M. Gómez Hidalgo, G. C. Bringas, E. P. Sánz, F. C. García, Content based SMS spam filtering, in: Proceedings of the ACM Symposium on Document Engineering, 2006, pp. 107-114; and D.-N. Sohn, J.-T. Lee, K.-S. Han, H.-C. Rim, Content-based mobile spam classification using stylistically motivated features, Pattern Recognition Letters 33 (2012) 364-369, each incorporated herein by reference in their entirety. However, their accuracy is still relatively low, and further research is required to investigate new features and new lightweight ways of calculating and utilizing them.

Most of the existing approaches for spam filtering focus on email spam and often treat the problem as a document categorization or genre classification problem where individual messages are preprocessed and represented term weight vectors are calculated using, for example, term frequency-inverse document frequency (TF-IDF). Then, statistical or machine-learning models are built using a training corpus to determine whether a particular message is spam or legitimate (ham). However, spam spans a wide range of topics and thus it is more effective to consider characteristics that are not only content related but also stylistic features. See F. Sebastiani, Text categorization, in: A. Zanasi (Ed.), Text Mining and its Applications, WIT Press, Southampton, UK, 2005, incorporated herein by reference in its entirety. Moreover, although both email spam and short message spam share a lot in common, there is little material in short messages for content-based filtering due to the limited message size, less contextual information, and use of idiosyncratic language with abbreviations, phonetic contractions, bad punctuation, and emotional symbols.

Machine learning based solutions for mining network data has received considerably growing attention from the security community to strengthen the resilience of information systems against various types of malicious activities. Empirical evaluation of some machine-learning algorithms on benchmark corpora are presented in Yu et al., Lai, Sharaff et al., Feng et al., Huda et al., and Moonsamy et al. See B. Yu, Z.-b. Xu, A comparative study for content-based dynamic spam classification using four machine learning algorithms, Knowledge-Based Systems 21 (2008) 355-362; C.-C. Lai, An empirical study of three machine learning methods for spam filtering, Knowledge-Based Systems 20 (2007) 249-254: A. Sharaff, N. K. Nagwani, A. Dhadse, Comparative study of classification algorithms for spam email detection, in: Proceedings of Emerging Research in Computing, Information, Communication and Applications (ERCICA), volume 2, Springer, 2015, pp. 237-244; W. Feng. Q. Zhang, G. Hu, J. X. Huang, Mining network data for intrusion detection through combining svms with ant colony networks, Future Generation Computer Systems 37 (2014) 127-140; S. Huda, J. Abawajy, M. Alazab, M. Abdollalihian, R. Islam, J. Yearwood, Hybrids of support vector machine wrapper and filter based framework for malware detection, Future Generation Computer Systems (2014); and V. Moonsamy, J. Rong, S. Liu, Mining permission patterns for contrasting clean and malicious android applications, Future Generation Computer Systems 36 (2014) 122-132, each incorporated herein by reference in their entirety. These algorithms belong to various categories including probabilistic, decision tree, support vector machines, and lazy algorithms.

Carpinter and Hunt, review current and potential future tools for automated spam filtering including machine-learning and non-machine learning approaches. See J. Carpinter, R. Hunt, Tightening the net: A review of current and next generation spam filtering tools, Computers & security 25 (2006) 566-578, incorporated herein by reference in its entirety. Several machine-learning approaches for spam filtering are also reviewed in Guzella et al. See T. S. Guzella, W. M. Caminhas, A review of machine learning approaches to spam filtering, Expert Systems with Applications 36 (2009) 10206-10222, incorporated herein by reference in its entirety. Content-based SMS spam filtering has been an active area of research. In Bozan et al., Bozan et al. presented an SMS spam filtering approach based on text classification and SVM, Bayesian, and KNN classification methods. See Y. Bozan, O. Cohan, G. Ozyer, B. Ozyer, SMS spam filtering based on text classification and expert system, in: Proceedings of the 23rd Signal Processing and Communications Applications Conference, 2015, incorporated herein by reference in its entirety. In El-Alfy et al., an email spam filtering is proposed based on the group method of data handling networks. See E.-S. El-Alfy, R. E. Abdel-Aal, Using gmdh-based networks for improved spam detection and email feature analysis, Applied soft computing 11 (2011) 477-488, incorporated herein by reference in its entirety. Support vector machines have been applied to filtering spam emails, and short message spam. See H. Drucker, D. Wu, V. N. Vapnik, Support vector machines for spam categorization, IEEE Transactions on Neural Networks 10 (1999) 1048-1054; Q. Li, X.-F. Li, Research on short message spam filtration based on support vector machine, China-Ireland International Conference on Information and Communications Technologies (CIICT 2007) (2007), each incorporated herein by reference in their entirety. Another approach based on Bayesian classification for SMS spam is proposed in Zhang et al. See H.-Y. Zhang, W. Wang, Application of bayesian method to spam SMS filtering, in: Proceedings of the International Conference on Information Engineering and Computer Science (ICIECS), 2009, incorporated herein by reference in its entirety. New content-based features have been proposed to improve the performance of SMS spam detection. See A. Karami, L. Zhou. Improving static SMS spam detection by using new content-based features, in: 20th Americas Conference on Information Systems, AMCIS, 2014, incorporated herein by reference in its entirety. Several variants of boosting trees have been studied for filtering spam emails in Carreras et al. See X. Carreras, L. Márquez, Boosting trees for anti-spam email filtering, in: Proceedings of the 4th International Conference on Recent Advances in Natural Language Processing, 2001, incorporated herein by reference in its entirety. In Chen et al., Chen et al. proposed an SMS spam control based on trust evaluation through the analysis of spam detection behaviors and SMS traffic data. See L. Chen, Z. Yan, W. Zhang, R. Kantola, Trusms: a trustworthy sms spam control system based on trust management, Future Generation Computer Systems 49 (2015) 77-93, incorporated herein by reference in its entirety.

Various forms of aggregations and hybrid solutions have been proposed in the literature. For instance, a multi-layer pipeline for spam filtering is proposed in Ouyang et al. See T. Ouyang, S. Ray, M. Allman, M. Rabinovich, A large-scale empirical analysis of email spam detection through network characteristics in a stand-alone enterprise, Computer Networks 59 (2014) 101-121, incorporated herein by reference in its entirety. The stages of the multi-layer pipeline consist of DNS blacklists and filters based on SYN packet features, traffic characteristics, and message content. Another hybrid technique is presented in Lopes et al. called symbiotic filtering consisting of distinct local filters from several users. See C. Lopes, P. Cortez, P. Sousa, M. Rocha, M. Rio, Symbiotic filtering for spam email detection, Expert Systems with Applications 38 (2011) 9365-9372, incorporated herein by reference in its entirety. This approach has been shown to be robust against both dictionary and focused contamination attacks. To address the difficulty to obtain negative training examples and the limitation of single class learning, Wei et al. proposed a two-stage framework. See C.-P. Wei, H.-C. Chen, T.-H. Cheng, Effective spam filtering: A singleclass learning and ensemble approach, Decision Support Systems 45 (2008) 491-503, incorporated herein by reference in its entirety. Ying et al. proposed an ensemble approach to classify spam emails based on decision tree, support vector machine, and back-propagation network. See K.-C. Ying, S.-W. Lin, Z.-J. Lee, Y.-T. Lin, An ensemble approach applied to classify spam e-mails, Expert Systems with Applications 37 (2010) 2197-2101, incorporated herein by reference in its entirety. In the earlier work of the inventors, a two-stage classifier using dendritic cell algorithm for filtering SMS messages was proposed. See A. A. Al-Hasan, E.-S. M. El-Alfy, Dendritic cell algorithm for mobile phone spam filtering, Procedia Computer Science 52 (2015) 244-251, incorporated herein by reference in its entirety. The proposed method was evaluated on two benchmark SMS datasets. In Yoon et al., a hybrid approach of content-based filtering and challenge-response is proposed. See J. W. Yoon, H. Kim, J. H. Huh, Hybrid spam filtering for mobile communication, computers & security 29 (2010) 446-459, incorporated herein by reference in its entirety. The content based filter classifies a message as spam, harm, or uncertain. If a message is classified as uncertain, it is checked further by sending a challenge to the message sender. The idea is that an automated spam generator is unlikely to reply with a correct response which is an indication that the message is spam. The simulation results demonstrated that this approach can achieve high accuracy regardless of the algorithm used for content-based filtering.

SUMMARY

Herein, the inventors analyze several stylistic and content-related features and study their impact on three machine-learning algorithms used separately and as a majority-vote committee. Inspired by the danger theory and immune-based systems, the inventors propose a novel approach based on the Dendritic Cell Algorithm (DCA) for fusing the results of Naïve Bayes (NB) and Support Vector Machines (SVM). The DCA is a relatively new approach in machine learning inspired by the function of immune system dendritic cells (DCs). Using three spam email datasets and two SMS datasets, the inventors evaluate and compare the effectiveness of individual feature sets and their impact on the classification performance for their impact on the classification performance of the proposed model. Then, the inventors combine the top two relevant feature sets and build a lightweight model.

A method is provided for filtering multimodal messages. The method includes receiving an electronic message; enriching the electronic message; extracting one or more features from the electronic message; generating, one or more dendritic cell signals based on the one or more features extracted from the electronic message; subjecting the one or more dendritic cell signals and the electronic message to a dendritic cell algorithm including one or more dendritic cells; determining a maturity of the one or more dendritic cells; and classifying the electronic message as spam based upon the maturity of the one or more dendritic cells.

An apparatus is provided for filtering multimodal messages. The apparatus includes processing circuitry configured to receive an electronic message; enrich the electronic message; extract one or more features from the electronic message; generate one or more dendritic cell signals based on the one or more features extracted from the electronic message; subject, via the processing circuitry, the one or more dendritic cell signals and the electronic message to a dendritic cell algorithm including one or more dendritic cells; determine a maturity of the one or more dendritic cells; and classify the electronic message as spam based upon the maturity of the one or more dendritic cells.

A non-transitory computer readable medium storing instructions is provided. The instructions, when executed by a computer, cause the computer to execute a process for filtering multimodal messages. The process includes receiving an electronic message; enriching the electronic message; extracting one or more features from the electronic message; generating one or more dendritic cell signals based on the one or more features extracted from the electronic message; subjecting the one or more dendritic cell signals and the electronic message to a dendritic cell algorithm including one or more dendritic cells; determining a maturity of the one or more dendritic cells; and classifying the electronic message as spam based upon the maturity of the one or more dendritic cells.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 shows an example of pseudo-code according to embodiments of the present disclosure;

DETAILED DESCRIPTION

The terms "a" or "an," as used herein, are defined as one or more than one. The term "plurality" as used herein, is defined as two or more than two. The term "another," as used herein, is defined as at least a second or more. The terms "including" and/or "having" as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program" may include a subroutine, a program module, a script, a function, a procedure, an object method, an object implementation, in an executable application, an applet, a servlet, a source code, an object code, a shared library/ dynamic load library and/or other sequence of instructions designed for execution on a computer system.

Reference throughout this document to "one embodiment," "certain embodiments," "an embodiment," "an implementation," "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Figure 1:
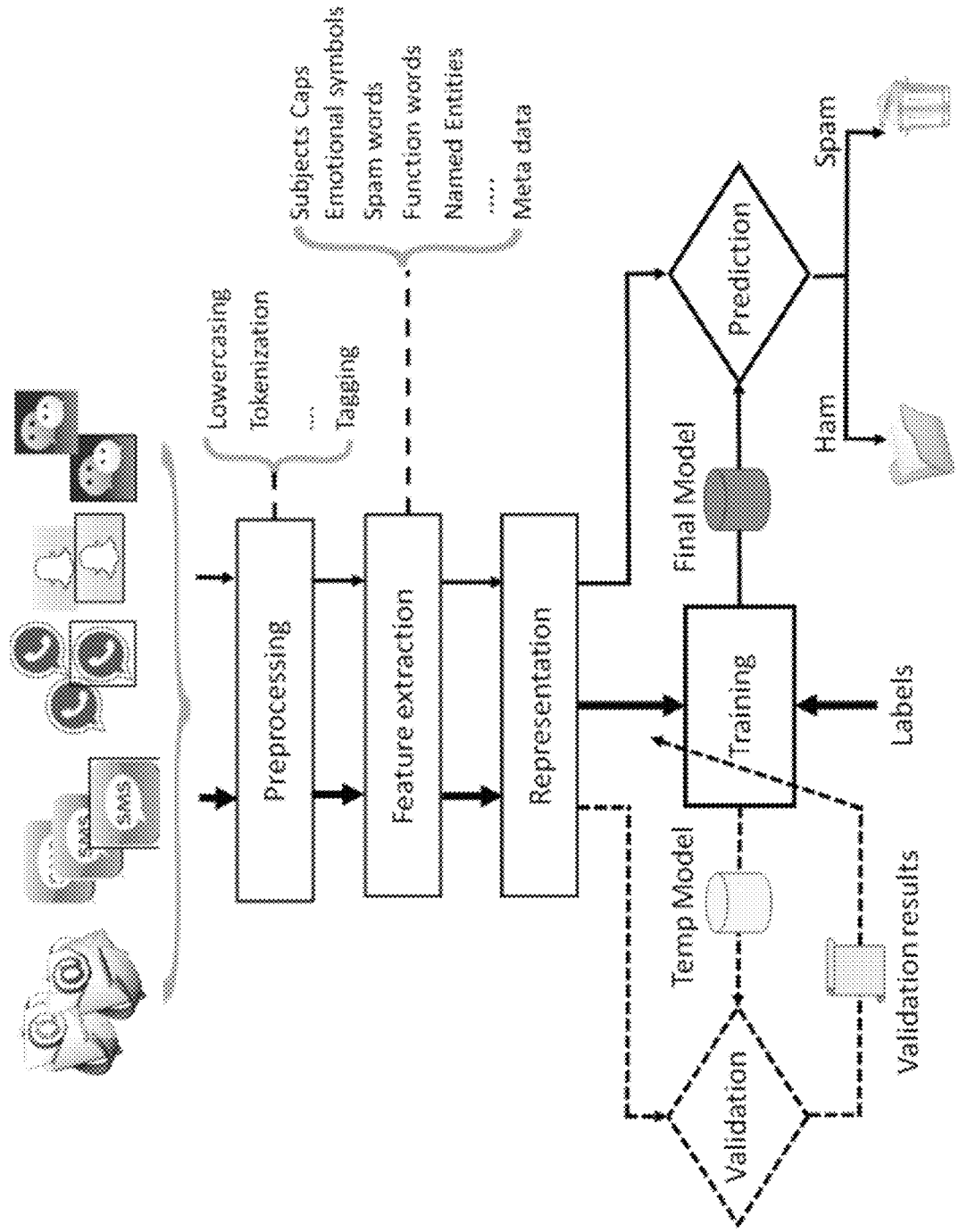
FIG. 1 is an example of a workflow for spam filtering in a multimodal communication system.

FIG. 1 shows a high-level framework of steps performed in the proposed spam filtering system. Herein, processing circuitry of a computer or mobile device is programmed to carry out the spam filtering. A memory, which stores instructions to be executed by the processing circuitry is provided. The processing circuitry, for example, executes the instructions to perform the spam filtering of the present disclosure.

Messages are received through various communication means. The communication means include, but are not limited to, email, SMS, MMS, and IM. IMs are sent and received by the processing circuitry through an application running on the computer or mobile device. The application can be a messaging service that is dedicated to instant messaging alone or one that includes additional content providing features, such as social media applications. The applications include, but are not limited to, Facebook, Instagram, WhatsApp, SnapChat, WeChat, Skype, LINE, Viber, and AIM.

Using a corpus of pre-classified messages, a training phase, as indicated by the solid thick workflow path, constructs a classification model. During the training phase, messages are preprocessed and analyzed to extract relevant features. Each message is represented with a vector. As indicated by dashed thin lines, a validation operation can be optionally performed while training a classifier. Once a classifier is constructed, it can be deployed to predict a class of newly received messages, as indicated by solid thin lines. The details of preprocessing, feature extraction, and training are provided below.

The preprocessing phase is described hereunder. To enrich messages, two types of semantic information tags are added: part-of-speech (POS) tags and recognized-entities tags. The POS tags are, for example, linguistic categories of words. The POS tags are assigned using, for example, the Penn Treebank tag set (http://www.cis.upenn.edu/~treebank/), incorporated herein by reference in its entirety. Examples of possible POS tags include, for example, noun, verb, adjective, and adverb. The recognized-entities tags, for example, correspond to recognized-named entities. The recognized-entities tags are assigned using, for example, the OpenNLP model (https://opennlp.apache.org/), incorporated herein by reference in its entirety. These entities include, for example, location, organization, money, date, person, and time. See M. H. Kim, P. Compton, Improving the performance of a named entity recognition system with knowledge acquisition, in: Knowledge Engineering and Knowledge Management, Springer, 2012, pp. 97-113, incorporated herein by reference in its entirety.

The message is then converted into lowercase characters before being passed to the next stage. The content of each message is treated as a string and then divided into distinct tokens (words). Each word is reduced to its root by removing all suffixes such as "tion," "ing," and "er." The Porter stemming algorithm, for example, can be used to achieve this task. See D. A. Hull, Stemming algorithms: A case study for detailed evaluation, Journal of the American Society for Information Science—Special Issue: Evaluation of Information Retrieval Systems 47 (1996) 70-84, incorporated herein by reference in its entirety.

The feature extraction phase is described hereunder. Feature extraction is, for example, a very crucial task for spam filtering. It should not require complex analysis so as to not to significantly delay the messaging service. However, the extracted features should also be highly correlated to the message category to enhance the spam detection accuracy. As a result, each message is represented with a feature vector denoted as $X=(x_1,x_2,x_3, \ldots ,x_m)$, where m is the number of features and $x_i$ for $i=1, \ldots, m$ represents a weight of the i-th feature to that message. The following features can be extracted and evaluated for spam detection.

URL Links. URL links can be normalized within the messages by replacing them with a single word, for example, httpLink. A number of URLs in the message can also be considered as a feature since malicious spam likely asks the user to click on a link to visit a website for a prize, to download an application, or to provide additional information.

Likely Spam Words. Words and phrases that are most commonly used by spammers, for example, finance, dating, and prizes. See Table 1. A number of spam words that exist in a message can also be considered as a feature.

TABLE 1

Examples of common spam words and phrases.

credit, loan, bills, info, money, investment, discount, win, order now, sign up, clearance, earn, free gift, free samples dating, find, guess, statement, private, dear, partner, singles, fast cash, incredible deal, free info, satisfaction, buy direct call free, call now, camcorder, phone, cards, extra inches, cialis, viagra, spa, beauty, money back, click here, act now prize, guaranteed, claim, cash, no fees, limited time, life insurance, mortgage, amazing, 100% satisfied, 100% free In an embodiment, sets of spam words evaluated include, for example, a list of 17,000 English and non-English keywords, collected from different sources that are independent of a dataset that the model is tested on; a list of 350 English spam words collected from different online sources and blogs that are independent of the dataset that the model is tested on; and/or a list of 250 spam words extracted from the dataset that the model is test on. See S. J. Delany, M. Buckley, D. Greene, SMS spam filtering: Methods and data, Expert Systems with Applications 39 (2012) 9899-9908; and K. Gao, A list of common spam words, http://emailmarketing.comm100.com/email-marketing-ebook/spam-words.aspx, 2014. Online; Checked: September 2015, each incorporated herein by reference in their entirety. The list of 250 spam words can be changed for each dataset used.

Emotion Symbols. The existence of emotion symbols and icons, for example, happy, angry, or sad faces may be a good indicator for legitimate messages. Regular expressions can be used to extract these symbols.

Special Characters. Special characters used to by-pass simple filters based on keywords. For example, dollar signs "$$$" could be used instead of money in prize or finance related messages. Regular expressions can be used to extract these symbols.

Gappy Words. Words that have gaps between its characters such as "@" and ".".

Message Metadata: Data including message length, which can be an overall byte length, a number of tokens, and/or an average token length.

JavaScript Code. The existence of JavaScript code within a message can be a sign of phishing or spam.

Function Words or Grammatical Words. Content words that have little lexical meaning or ambiguous meaning, but exist to explain structural or grammatical relationships with other words within a sentence or to specify the mood or attitude of the author of the sentence. Function words, for example, form a closed class of words that is fixed and has a relatively small size. Function words are lexically unproductive and are generally invariable in form. Examples of function words are prepositions, pronouns, determiners, conjunctions, auxiliary verbs, and particles. See Table 2. Function words features are evaluated because they are very unlikely to be subject to conscious control by the author due to their high frequency of use and highly grammatical role. See S. Argamon, S. Levitan, Measuring the usefulness of function words for authorship attribution, in: Proc. ACH/ALLC Conference, 2005, incorporated herein by reference in its entirety. A word list of functional words available in Gilner et al. was used in an exemplary embodiment. See L. Gilner, F. Morales, Function words, http://www.sequence-publishing.com/academic.html, 2005. Online; Checked: September 2015, incorporated herein by reference in its entirety.

TABLE 2

Examples of function words.

| Class | Size | Examples |
| --- | --- | --- |
| Prepositions | 124 | of, at, in, on, for, without, between, besides, close to, down |
| Pronouns | 70 | he, she, you, him, her, our, anybody, it, one |
| Determiners | 28 | a, the, all, both, either, neither, some, those, every |
| Conjunctions | 44 | and, after, hence, that, when, while, although, or, yet |
| Aux and modal verbs | 17 | may, had better, used to, might, shall, be able to, can |
| Quantifiers | >86 | no, none, one, two, much, many, the whole, part, various |

Recipient Address Fields. As spammers often send email to a group of users by putting the addresses of the users into the BCC field instead of the To field, a blank To field can be extracted as a feature. A number of characters and/or a number of recipients in the one or more of the recipient address fields can be extracted as features.

Subject Field. A number of spam words in the subject field, a length of the subject field, and/or a ratio of capital characters to non-capital characters can be extracted as features.

Domain. A domain from which the message is sent can be extracted as a feature. Spam domains in the Internet that have trustworthiness issues with their mail server, such as allowing sending email without authentication can be extracted. In an embodiment, a list of more than 200 untrusted domains, that are known for sending spam email, can be used as a set list for extracting features.

Enrichment tags. The POS tags and the recognized-entities tags added in the preprocessing phase are also extracted. In some cases, the POS tags for only a first and a last term in each message are extracted as features, since they describe embedded grammatical structure that is unlikely to vary for each spammer or author. See W. R. Wright, D. N. Chin, Personality profiling from text: Introducing part-of-speech n-grams, in: User Modeling, Adaptation, and Personalization, Springer, 2014, pp. 243-253, incorporated herein by reference in its entirety.

The DCA is a recent immune-inspired classification algorithm developed based on the behavior and function of (DCs) in the biological immune system. See J. Greensmith, U. Aickelin, The deterministic dendritic cell algorithm, in: Artificial Immune Systems, Springer, 2008, pp. 291-302; and J. Greensmith, U. Aickelin, S. Cayzer, Detecting danger: The dendritic cell algorithm, in: Robust Intelligent Systems, 2008, pp. 89-112, each incorporated herein by reference in their entirety. The algorithm was successfully applied to solve a number of classification problems in various domains, for example. See R. Huang, H. Tawfik, A. Nagar, Artificial dendritic cells algorithm for online break-in fraud detection, in: Proceedings of the 2nd IEEE International Conference on Developments in eSystems Engineering (DESE), 2009, pp. 181-189; and Z. Chelly, Z. Elouedi, Hybridization schemes of the fuzzy dendritic cell immune binary classifier based on different fuzzy clustering techniques, New Generation Computing 33 (2015) 1-31, each incorporated herein by reference in their entirety. The algorithm starts with a collection of DCs, each of which is exposed to antigens (objects, and in the context of the instant disclosure, messages) and environmental signals. Hereinbelow, a novel approach for generating signals from the feature vectors is described. Then, how the DCA utilizes these signals to detect SMS spam messages is discussed.

In the DCA, there are, for example, three types of signals: PAMP, Danger, and Safe. The PAMP signal is a measure of confidence that the antigen (message) represents span. The Danger signal is a measure that indicates potential abnormality. The value of the Danger signal increases as the confidence of the monitored system being in an abnormal status increases. Finally, the Safe signal is a measure that increases in value in conjunction with legitimate messages. The Safe signal represents a confidence indicator of normal, predictable, or steady-state system behavior.

To generate these signals, the outputs of two different machine-learning algorithms, Naïve Bays (NB) and Support Vector Machine (SVM), are combined. The pseudo-code of this process for this signal generation is outlined in Algorithm 1 of FIG. 2. For a particular message, each classifier, NB and SVM, takes the feature vector representing the message as input and generates a decision with a confidence level. Since the PAMP signal indicates a high level of assurance of an anomalous situation, it is generated using a highest confidence level of the two classifiers when both classifiers, NB and SVM, agree that the antigen (message) is spam. The second type of signal, Danger, indicates presence of danger, which may or may not indicate an anomalous situation. However, the probability of an anomaly is higher than under normal circumstances. Hence, when both classifiers disagree on the antigen (message) classification, an average confidence level of the two classifiers is used to generate the Danger signal. Finally, the presence of the Safe signal indicates that no anomalies are present. If the two classifiers, NB and SVM, agree that the antigen (message) is non-spam, the highest confidence level of the two classifiers are used to generate the Safe signal. The derived signals and associated antigens (messages) are passed to the DCA as input.

Figure 2:
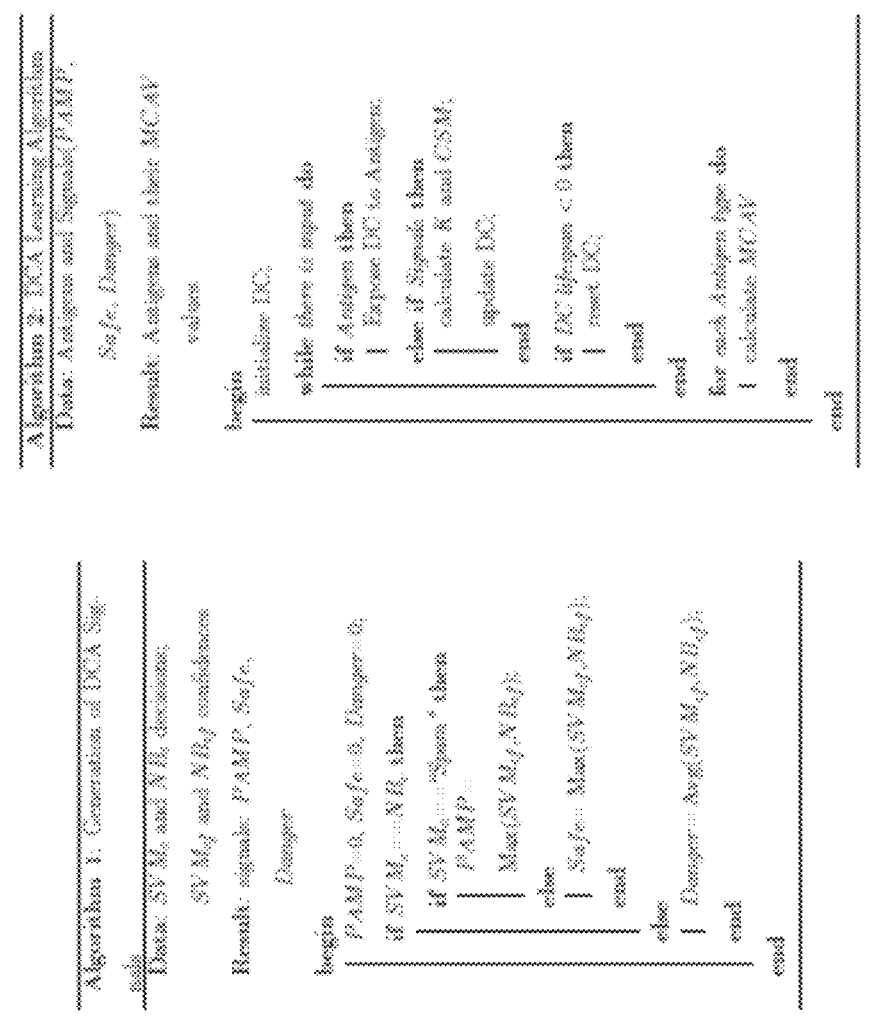
Figure 3:
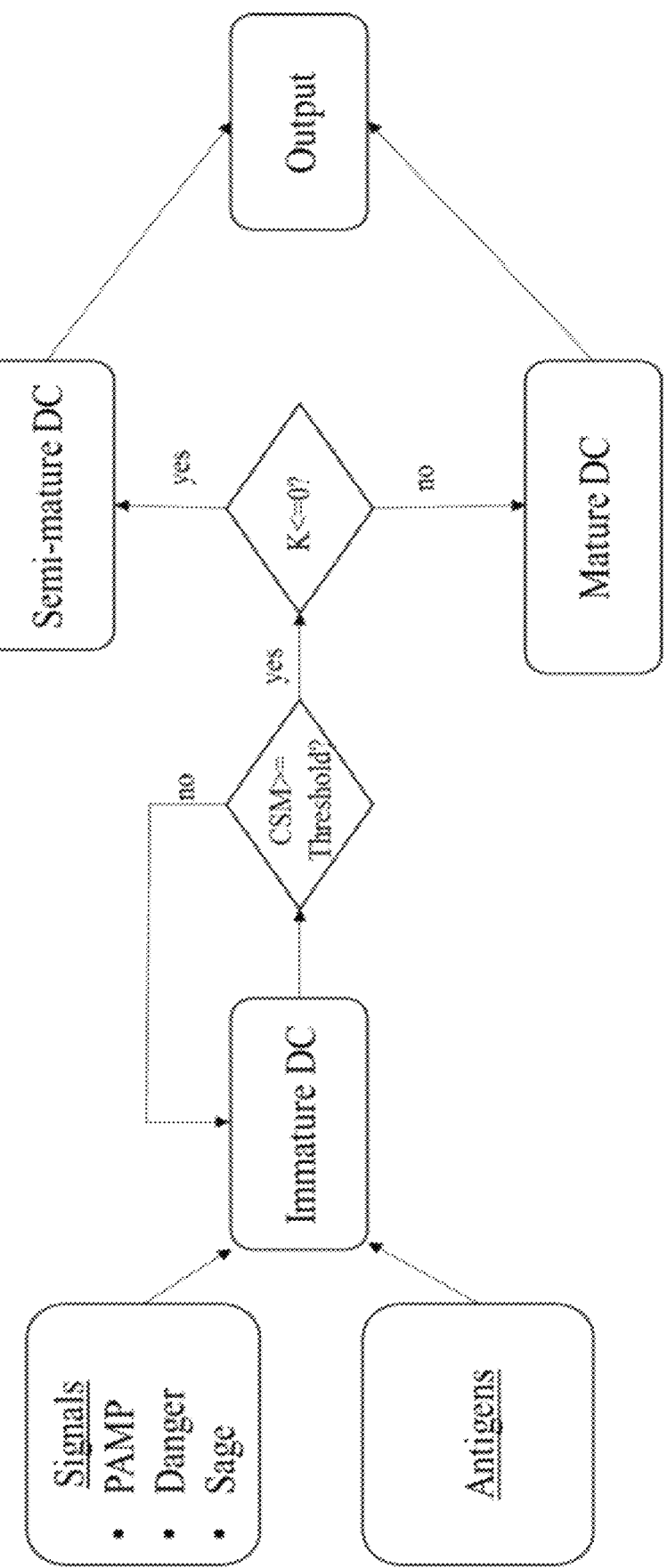
FIG. 3 shows an example of classification of dendritic cells according to embodiments of the present disclosure.

A high-level view of the main steps in the DCA is shown in Algorithm 2 of FIG. 2. This algorithm, for example, starts with a population of dendritic cells. Each DC has a different lifespan which is initialized to, for example, a random value. The DC then changes over time based on exposure to antigens (messages) and signals PAMP, Danger, and Safe. The combination of signals and antigen temporal correlation, as well as diversity of the DC population is responsible for the detection capability of the DCA. A maximum number of antigens that should be collected by a single DC is determined by concentration of co-stimulatory molecules (CSM), which is initially assigned randomly to each DC. When a threshold value of the CSM is reached, the DC is migrated and transformed to a mature or semi-mature state. The transformation is, for example, based on an overall abnormality of signals seen by a DC which is denoted as K. At a particular exposure n, the impact of the three types of signals PAMP, Danger, and Safe on CSM and K is calculated using the following formulas:

$$\Delta CSM = PAMP_n \times wc_p + Danger_n \times wc_d + Safe_n \times wc_s$$

$$\Delta K = PAMP_n \times wk_p + Danger_n \times wk_d + Safe_n \times wk_s$$

where $PAMP_n$, $Danger_n$, and $Safe_n$ are the input signals, $wc_p$, $wc_d$, and $wc_s$ are weights associated with CSM, and $wk_p$, $wk_d$, and $wk_s$ are weights associated with K. DCs are classified as mature or semi-mature based on the accumulated values of CSM and K, as shown in FIG. 3.

The final decision to classify an antigen as Spam or Legitimate (ham) is made based on the number of DCs that are fully mature. This is done, for example, by computing a mature context antigen value (MCAV). This value gives a probability of a pattern being anomalous. The closer MCAV is to 1, the greater the probability that the antigen (message) is anomalous. To overcome the problem of antigen deficiency and to ensure that it appears in several contexts, each antigen is sampled multiple times using an antigen multiplier parameter of the DCA. The DCA calculates the MCAV value for each antigen type using the following formula:

$$MCAV = \frac{M_i}{\Sigma Ag}$$

where i refers to a antigen type (spam), $M_i$ refers to a number of times that antigen appears in the mature context and $\Sigma Ag$ is the total number of antigens. The MCAV value is then used to classify the message by comparing it to an anomaly threshold that is calculated from:

$$at = \frac{an}{tn}$$

where at is an anomaly threshold, an is the number of anomalous data items and tn is the total number of data items. A classification rule applied on the i-th message is as follows:

$$f(x) = \begin{cases} \text{Spam,} & \text{if } MCAV > at \\ \text{Legitimate,} & \text{otherwise} \end{cases}$$

where the message (antigen) is considered spam if MCAV is greater than the anomaly threshold and the message (antigen) is considered legitimate otherwise.

A critical element in training and evaluation of data analytic algorithms is the availability of representative datasets or corpora with large number of instances. However, collecting and maintaining legitimate emails for anti-spammers is a challenging task due to privacy reasons. Hence, some researchers have utilized either datasets that are not publicly accessible or a combination of private and public datasets in their research. Mixing data from different sources can lead to biased training since the corpus distribution might not reflect the real case. To enable benchmarking for newly proposed ideas and algorithms, researchers have used a number of spam corpora that are publicly available for research purpose. Some datasets exist in raw format while others are pre-processed with limited number of attributes. To protect end-users privacy some datasets have encoded some terms.

Herein five of the widely-used benchmark datasets, as summarized in Table 3, were adopted. Each dataset has specific characteristics such as number of users considered and general subject of the messages included.

TABLE 3

Adopted benchmark datasets

| Dataset | Type | Raw/Pre-processed | Total | Spam | Legitimate |
|---|---|---|---|---|---|
| DS1: Spambase | Email | Preprocessed | 4601 | 1813 | 2788 |
| DS2: SpamAssassin | Email | Raw | 2713 | 1323 | 1390 |
| DS3: TREC2005 | Email | Raw | 504 | 228 | 276 |
| DS4: Corpus V.0.1 Big | SMS | Raw | 1324 | 322 | 1002 |
| DS5: Spam Collection V.1 | SMS | Raw | 5574 | 747 | 4827 |

Effectiveness is evaluated in terms of a percentage detection accuracy which is calculated from:

$$ACC = \frac{TP + TN}{TP + FP + FN + TN} \times 100$$

where ACC is the accuracy, TP is the number of true positives, TN is the number of true negatives, FP is the number of false positives, and FN is the number of false negatives. In this context, positive refers to a message considered as spam and negative refers to a message considered as non-spam. Percentage recall (REC), precision (PRE), and F-measure (F) were also calculated for each category. Moreover, the area under the Receiver Operating Characteristic (ROC) curve (AUC) was computed.

Several experiments were performed to choose the best parameter values, as measured by AUC. For each dataset, parameters were varied and various combinations of values were evaluated. Table 4 shows the best selected values for each parameter for each dataset.

TABLE 4

Best values for DCA parameters

| Dataset | Signal Weights | | | | | | #DCs | Multiplier |
| | $wc_p$ | $wc_d$ | $wc_s$ | $wk_p$ | $wk_d$ | $wk_s$ | | |
|---|---|---|---|---|---|---|---|---|
| DS1 | 2 | 1 | 1 | 2 | −3 | 1 | 30 | 100 |
| DS2 | 1 | 0 | 1 | 10 | −1 | 1 | 10 | 100 |
| DS3 | 2 | 1 | 1 | 1 | −3 | 1 | 30 | 70 |
| DS4 | 2 | 1 | 1 | 2 | −3 | 1 | 40 | 80 |
| DS5 | 2 | 1 | 1 | 2 | −3 | 1 | 30 | 50 |

Using the parameters shown in Table 4, the performance of the proposed system was compared with that of the KNN, NB, and SVM algorithms. The results were compared with a committee of KNN, NB, and SVM using majority vote (MV).

Figure 4:
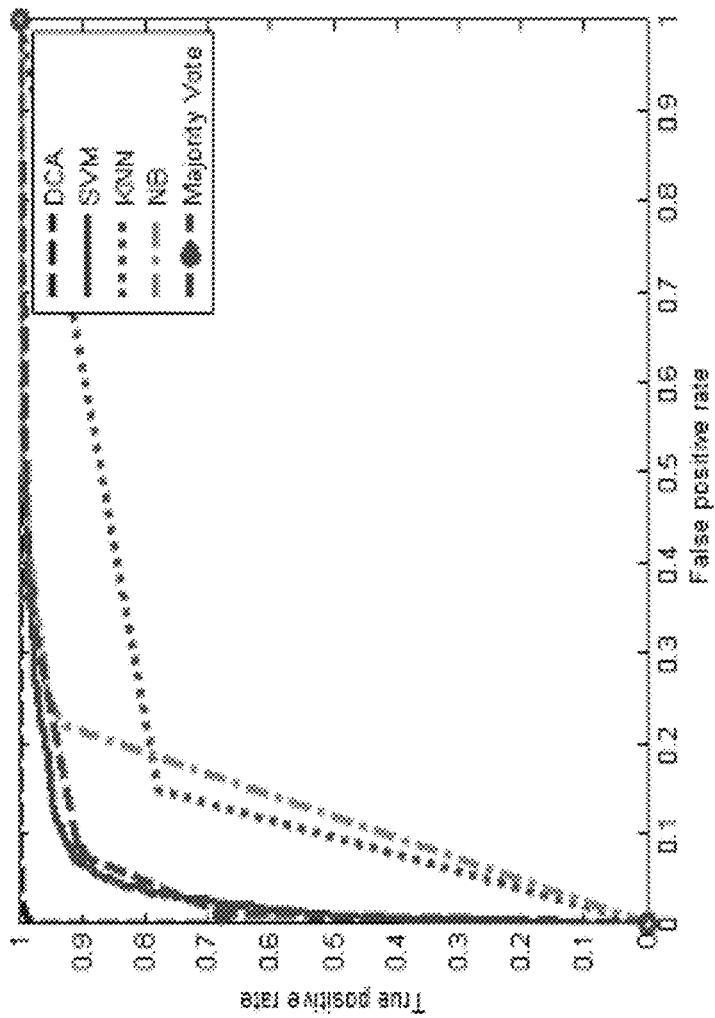
FIG. 4 shows an ROC performance comparison of DS1.

The Spambase dataset (DS1) has been very popular in several studies of general machine-learning classifiers, text mining algorithms, and anti-spam solutions. It is publicly accessible through UCI Machine-Learning Repository. It was created by Mark Hopkins, Erik Reeber, George Forman, and Jaap Suermondt at Hewlett-Packard Labs in 1999. There are 4601 email instances and out of them 1813 (39.4%) are spam. It is available in a pre-processed format where each email is described by 58 attributes (56 continuous attributes and a classification label, i.e. spam or non-spam). Most of the attributes indicate how frequent a particular word or character occurred in the e-mail. The first 48 attributes are of type word_freq_WORD which represent a frequency of the particular word and are real-valued in the range [0,100]. Attributes 49 to 54 are of type char_freq_CHAR which represent a frequency of the particular character and are real values in the range [0,100]. Attributes 55 and 56 are of type capital_run_length_average and capital_run_length_longest. Attributes 55 and 56 measure an average length and a maximum length, respectively, of continuous capital letters in the message. Attribute 57 is of type capital_run_length_total and it measures the total number of capital letters in the message. Attributes 55-57 have integer values in the range $[1,\infty]$. The last attribute denotes whether the e-mail was considered spam (1) or non-spam (0). Performance of the several classifiers can be seen in Table 5. The ROC performance comparison of those classifiers is shown in FIG. 4.

TABLE 5

Performance of several classifiers for Spambase dataset

| | Spam | | | Ham | | | | |
| Classifier | PRC | REC | F | PRC | REC | F | Acc | AUC |
|---|---|---|---|---|---|---|---|---|
| KNN | 0.773 | 0.780 | 0.776 | 0.856 | 0.851 | 0.853 | 0.823 | 0.815 |
| NB | 0.697 | 0.958 | 0.806 | 0.963 | 0.728 | 0.829 | 0.818 | 0.872 |
| SVM | 0.926 | 0.828 | 0.874 | 0.896 | 0.956 | 0.925 | 0.906 | 0.963 |

TABLE 5-continued

Performance of several classifiers for Spambase dataset

|  | Spam | | | Ham | | | | |
|---|---|---|---|---|---|---|---|---|
| Classifier | PRC | REC | F | PRC | REC | F | Acc | AUC |
| MV | 0.883 | 0.905 | 0.894 | 0.937 | 0.922 | 0.929 | 0.915 | 0.957 |
| Proposed | 0.964 | 0.996 | 0.979 | 0.997 | 0.976 | 0.986 | 0.983 | 0.999 |

30th Annual International ACM SIGIR Conference on Research and Development in Information Retrieval, 2007, pp. 871-872, each incorporated herein by reference in their entirety. GI calculates a weight of each feature with respect to the message classification. This table demonstrates that some features may perform better than others. The higher the weight of a feature, the more relevant it is considered. The performance of three machine-learning algorithms for three combinations of features: Top-2, Top-5, and All features were compared. Table 7 shows the results for NB, SVM, and KNN in terms of AUC. As can be seen, as more features are included, the performance of each classifier is improved.

TABLE 6

GI-based feature ranking for DS2 and DS3

| | DS2 | | | DS3 | |
|---|---|---|---|---|---|
| Rank | Feature | GI | Rank | Feature | GI |
| 1 | Ind__17k__Spam__Word in body | 1 | 1 | Spam domain | 1 |
| 2 | Ind_350_Spam_Word in body | 0.9517 | 2 | Subject length | 0.3745 |
| 3 | Spam domain | 0.3550 | 3 | Dep_Spam_Word in body | 0.2003 |
| 4 | Size of the message | 0.3278 | 4 | Special characters | 0.1192 |
| 5 | Num_users in "CC" fields | 0.3236 | 5 | Num_users in "To" | 0.1191 |
| 6 | Num_chars in "To" | 0.3211 | 6 | Num_chars in "To" | 0.1109 |
| 7 | Ind_17k_Spam_Word in Subject | 0.3159 | 7 | Money word (variant) | 0.1063 |
| 8 | Money word (variant) | 0.2973 | 8 | Size of the message | 0.0812 |
| 9 | Ind_350_Spam_Word in Subject | 0.2954 | 9 | Function word | 0.0765 |
| 10 | Subject capital | 0.1991 | 10 | Ind_17k_Spam_Word in body | 0.0732 |
| 11 | Number of users in "To" | 0.1540 | 11 | Subject capital | 0.0704 |
| 12 | Dep_Spam_Word in Subject | 0.0920 | 12 | Number of users in "CC" fields | 0.0646 |
| 13 | Function word | 0.0867 | 13 | Prescription word (variant) | 0.0624 |
| 14 | Prescription word (variant) | 0.0507 | 14 | Blank "To" field | 0.0512 |
| 15 | Dep_Spam_Word in body | 0.0467 | 15 | Ind_350_Spam_Word in body | 0.0343 |
| 16 | Special characters | 0.0356 | 16 | Viagra word (variant) | 0.0294 |
| 17 | Blank "To" field | 0.0344 | 17 | Cialis word (variant) | 0.0248 |
| 19 | Subject length | 0.0315 | 19 | Gappy word | 0.0228 |
| 20 | Attachment Count | 0.0261 | 20 | Dep_Spam_Word in Subject | 0.0183 |
| 21 | Viagra word (variant) | 0.0252 | 21 | Attachment Count | 0.0069 |
| 22 | Gappy word | 0.0015 | 22 | Ind_350_Spam_Word in Subject | 0.0026 |
| 23 | JavaScript | 0 | 23 | Ind_17k_Spam_Word in Subject | 0 |
| 24 | Cialis word (variant) | 0 | 24 | JavaScript | 0 |

Two large raw datasets, which are publicly available for email spam: SpamAssassin (DS2) and TREC 2005 (DS3), were also studied. The first corpus, SpamAssassin, includes complete emails with header, body, and subject. For privacy reasons, some host names were replaced with "spamassassin.taint.org" (which has a valid MX record); however, in most cases the messages appear exactly as they were received. The emails were collected from various sources such as mailing lists or emails reported to the SpamAssassin team. The second dataset, TREC 2005, was created for the TREC spam evaluation track based on the Enron corpus and spam messages collected in 2005. The emails were classified and augmented by additional spam emails from public sources. The emails were split into four groups.

To evaluate the relevance of each feature for spam filtering, the Gini index (GI) based ranking, as shown in Table 6, was adopted. See S. J. Hong, Use of contextual information for feature ranking and discretization, IEEE Transactions on Knowledge and Data Engineering 9 (1997) 718-730; and G. V. Cormack, J. M. G. Hidalgo, E. P. Sánz, Feature engineering for mobile (SMS) spam filtering, in: Proceedings of the

TABLE 7

AUC for three combinations of features for DS2 and DS3

| Dataset | Classifier | Top-2 Features | Top-5 Features | All Features |
|---|---|---|---|---|
| DS2 | NB | 0.781 | 0.837 | 0.854 |
|  | SVM | 0.799 | 0.884 | 0.917 |
|  | KNN | 0.286 | 0.506 | 0.678 |
| DS3 | NB | 0.87 | 0.919 | 0.93 |
|  | SVM | 0.799 | 0.847 | 0.872 |
|  | KNN | 0.5 | 0.571 | 0.714 |

Figure 5B:
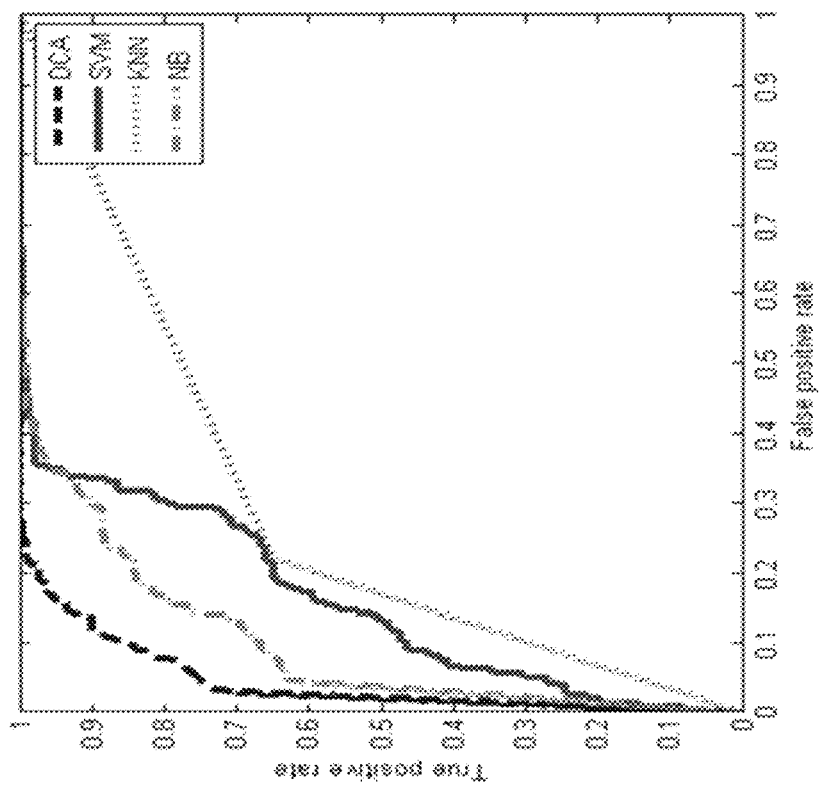
FIG. 5B shows an ROC performance comparison of DS3.
Figure 5A:
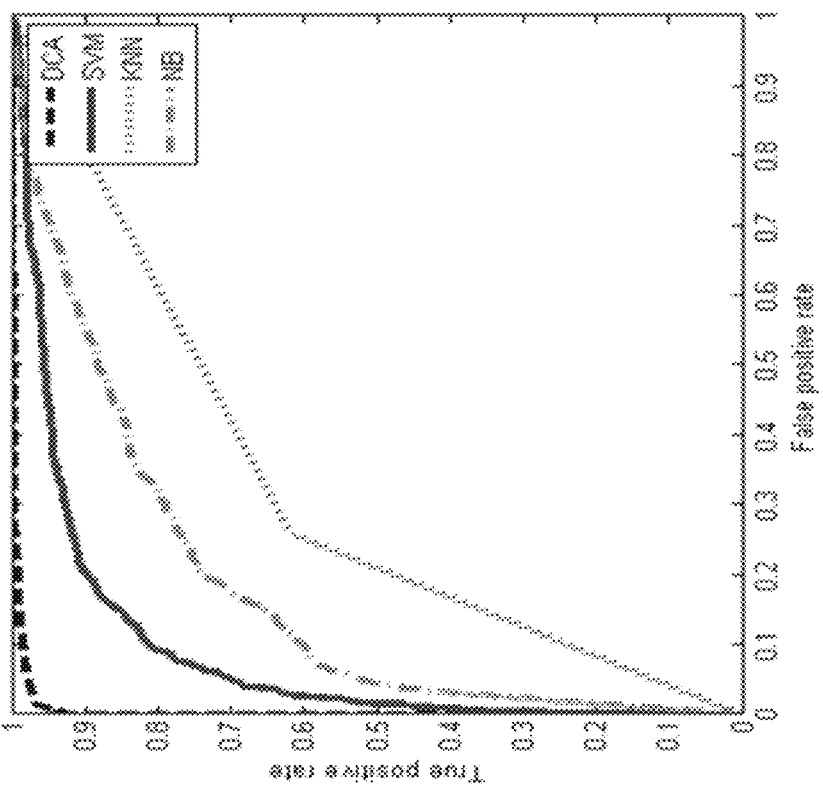
FIG. 5A shows an ROC performance comparison of DS2.

Using all features, various classification models were built and their performance compared in terms of spam recall and precision, ham (non-spam) recall and precision, accuracy and AUC. Table 8 shows the results for KNN, SVM, NB, Majority Vote (MV), and the proposed model. The ROC curve for DS2 is shown in FIG. 5A and the ROC curve for DS3 is shown in FIG. 5B. These results show remarkable improvement can be achieved for email spam filtering using the proposed model.

TABLE 8

Performance of several classifiers for DS2 and DS3

| Dataset | Classifier | Spam | | | Ham | | | Acc | AUC |
|---|---|---|---|---|---|---|---|---|---|
| | | PRC | REC | F | PRC | REC | F | | |
| DS2 | KNN | 0.693 | 0.616 | 0.652 | 0.672 | 0.741 | 0.704 | 0.68 | 0.678 |
| | NB | 0.92 | 0.47 | 0.621 | 0.658 | 0.961 | 0.781 | 0.722 | 0.854 |
| | SVM | 0.961 | 0.529 | 0.681 | 0.689 | 0.981 | 0.809 | 0.762 | 0.917 |
| | MV | 0.958 | 0.522 | 0.676 | 0.689 | 0.979 | 0.809 | 0.759 | 0.827 |
| | Proposed | 0.987 | 0.958 | 0.972 | 0.961 | 0.988 | 0.974 | 0.973 | 0.994 |
| DS3 | KNN | 0.712 | 0.649 | 0.677 | 0.723 | 0.775 | 0.746 | 0.72 | 0.714 |
| | NB | 0.678 | 0.978 | 0.799 | 0.969 | 0.594 | 0.732 | 0.774 | 0.93 |
| | SVM | 0.709 | 0.933 | 0.802 | 0.922 | 0.655 | 0.758 | 0.782 | 0.872 |
| | MV | 0.674 | 0.925 | 0.780 | 0.915 | 0.643 | 0.755 | 0.768 | 0.824 |
| | Proposed | 0.793 | 0.974 | 0.874 | 0.973 | 0.79 | 0.872 | 0.873 | 0.957 |

A series of experiments were performed to evaluate the individual feature sets extracted from two short message spam datasets: SMS Spam Corpus V.0.1 Big (DS4) and SMS Spam Collection V.1 corpus (DS5).

DS4 is a collection of 1,002 legitimate messages and 322 spam SMSs in English language. The legitimate SMS messages were randomly selected from the National University of Singapore (NUS) SMS corpus (10,000 legitimate SMSs) and the Jon Stevenson corpus (202 legitimate SMSs). The spam messages were collected manually from the Grumbletext Website, which is a public UK forum where users claims SMS spam messages. The average word length is 4.44 characters and the average number of words per message is 15.72. This dataset is available at (http://www.esp.uem.es/jmgomez/smsspamcorpus/) and has been used in G. V. Cormack et al. See G. V. Cormack, J. M. G. Hidalgo, E. P. Sánz, Feature engineering for mobile (SMS) spam filtering, in: Proceedings of the 30th Annual International ACM SIGIR Conference on Research and Development in Information Retrieval, 2007, pp. 871-872, incorporated herein by reference in its entirety.

On the other hand, DS5 is a collection of spam and legitimate messages publicly available in raw format at (www.dt.fee.unicamp.br/~tiago/smsspamcollection/) and is also hosted at the UCI machine-learning repository. There are a total of 5,574 SMS messages in English gathered from four free or free for research sources: Grumbletext Website (425 SMS), Caroline Tag's Ph.D. Thesis (450 SMS), National University of Singapore (3,375 SMS), and Jon Stevenson Corpus (1,324 SMS). The corpus has a total of 4,827 legitimate messages and 747 spam messages. This corpus is described and analyzed in Almeida et al. and has been recently used in Almieda et al. See T. Almeida, J. M. G. Hidalgo, T. P. Silva, Towards SMS spam filtering: Results under a new dataset, International Journal of Information Security Science 2 (2013) 1-18, incorporated herein by reference in its entirety.

Figure 6A:
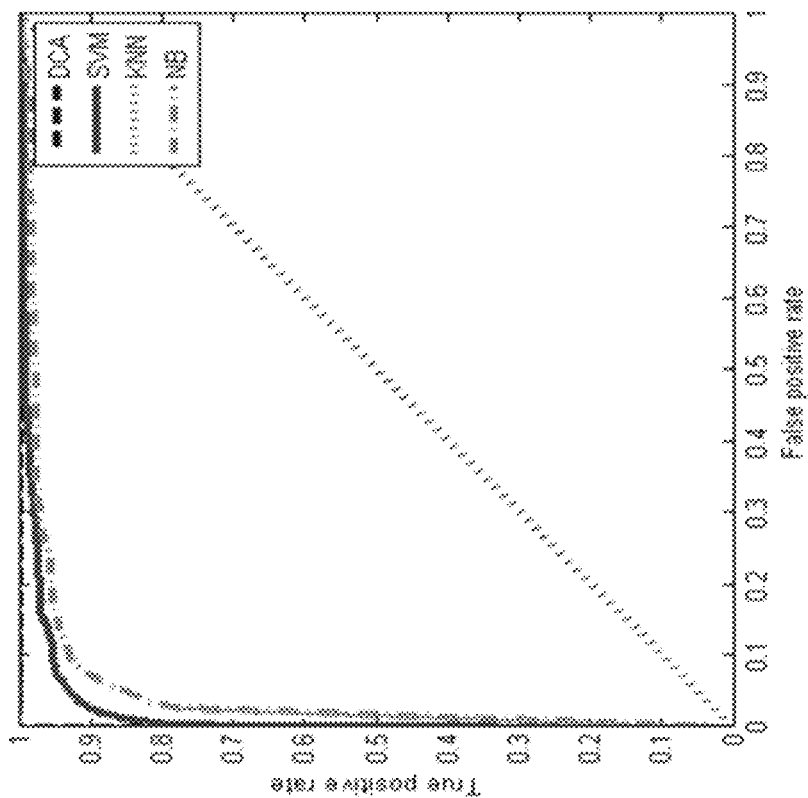
FIG. 6A shows an ROC performance comparison of DS4.
Figure 6B:
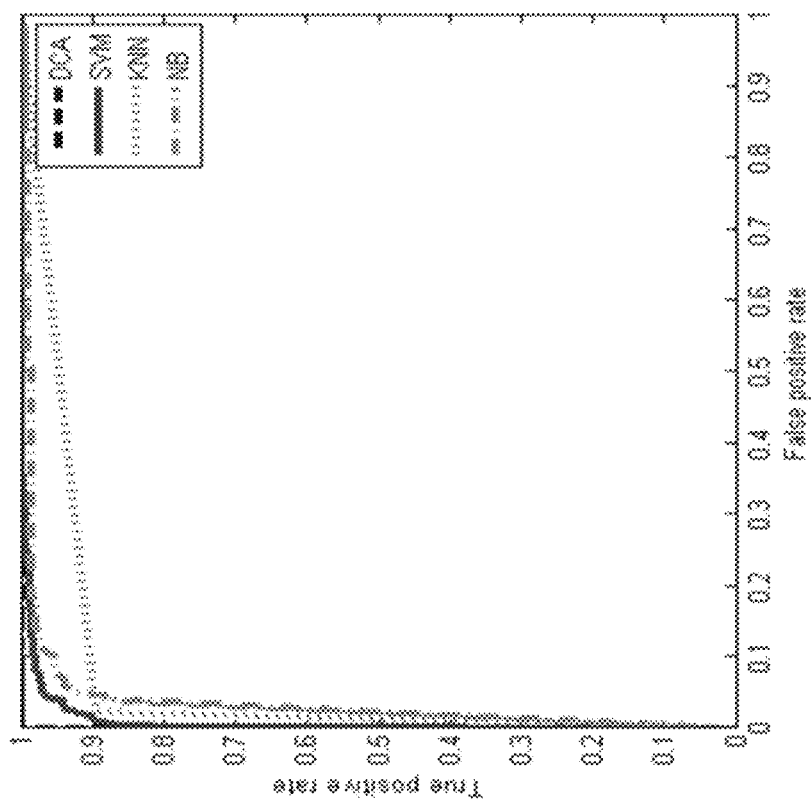
FIG. 6B shows an ROC performance comparison of DS5.

For DS4 and DS5, the features were ranked using GI as shown in Table 9. The performance measures and comparisons are reported in Table 10. The ROC curve for DS4 is shown in FIG. 6A and the ROC curve for DS5 is shown in FIG. 6B. These sets of experiments and attained results show that the proposed approach significantly outperforms all other classifiers.

TABLE 9

GI-based feature ranking for DS4 and DS5

| DS4 | | | DS5 | | |
|---|---|---|---|---|---|
| Rank | Feature | GI | Rank | Feature | GI |
| 1 | Ind_350_Spam_Word | 1 | 1 | Ind_17k_Spam_Word | 1 |
| 2 | Ind_17k_Spam_Word | 0.9843 | 2 | Ind_350_Spam_Word | 0.0800 |
| 3 | Dep_Spam_Word | 0.7304 | 3 | Dep_Spam_Word | 0.7201 |
| 4 | Date tag | 0.2117 | 4 | Special characters | 0.2481 |
| 5 | Function word | 0.2115 | 5 | Date tag | 0.1328 |
| 6 | Organization tag | 0.1094 | 6 | Organization tag | 0.1002 |
| 7 | Special characters | 0.0442 | 7 | Function word | 0.0577 |
| 8 | Location tag | 0.0300 | 8 | Location tag | 0.0255 |
| 9 | Price word (variant) | 0.0075 | 9 | Price word (variant) | 0.0183 |
| 10 | Person tag | 0.0054 | 10 | Gappy word | 0.0056 |
| 11 | Gappy word | 0.0046 | 11 | Time tag | 0.0040 |
| 12 | Time tag | 0.0039 | 12 | Money word (variant) | 0.0013 |
| 13 | Money word (variant) | 0.0023 | 13 | Money tag | 7.98E−04 |
| 14 | Money tag | 0 | 14 | Person tag | 3.75E−04 |
| 15 | Prescription word (variant) | 0 | 15 | Prescription word (variant) | 4.05E−05 |
| 16 | Emotion symbols | 0 | 16 | Emotion symbols | 0 |

TABLE 10

Performance of several classifiers for SMS datasets

| Dataset | Classifier | Spam PRC | REC | F | Ham PRC | REC | F | Acc | AUC |
|---|---|---|---|---|---|---|---|---|---|
| DS4 | KNN | 0.926 | 0.894 | 0.908 | 0.966 | 0.976 | 0.971 | 0.955 | 0.872 |
|  | NB | 0.786 | 0.955 | 0.861 | 0.984 | 0.915 | 0.948 | 0.924 | 0.973 |
|  | SVM | 0.969 | 0.89 | 0.927 | 0.966 | 0.991 | 0.978 | 0.965 | 0.991 |
|  | Proposed | 0.973 | 1 | 0.986 | 1 | 0.991 | 0.995 | 0.993 | 0.999 |
| DS5 | KNN | 0.881 | 0.851 | 0.865 | 0.977 | 0.982 | 0.98 | 0.964 | 0.499 |
|  | NB | 0.602 | 0.926 | 0.729 | 0.988 | 0.904 | 0.944 | 0.907 | 0.961 |
|  | SVM | 0.952 | 0.816 | 0.878 | 0.972 | 0.993 | 0.983 | 0.97 | 0.977 |
|  | Proposed | 0.959 | 1 | 0.979 | 1 | 0.993 | 0.997 | 0.994 | 0.999 |

For DS4 and DS5, an impact of a number of feature sets on the performance of SVM and NB was explored as shown in Table 11 and 12, respectively. The performance is recorded for 10-fold cross validation in terms of the precision, recall, and F-measure for each category. The tables also show the percentage overall accuracy and the area under the ROC curve for each case. Analyzing these results, there are two dominating feature sets with very high AUCs: "Spam Words (SW)" and "Metadata (MD)." These two feature sets were merged and the classifiers rebuilt. This combination is more effective for both datasets. From the computational prospective, for example, it is better to combine only two feature sets rather than combining all the feature sets.

TABLE 11

SVM classification results

| Dataset | Feature Set | Spam PRE | REC | F | Ham PRE | REC | F | Acc | AUC |
|---|---|---|---|---|---|---|---|---|---|
| DS4 | URL | 0.933 | 0.138 | 0.235 | 0.788 | 0.998 | 0.881 | 0.567 | 78.85 |
|  | Spam words (SW) | 0.985 | 0.810 | 0.887 | 0.945 | 0.996 | 0.970 | 0.983 | 95.16 |
|  | Emotion symbols | 0.000 | 0.000 | 0.000 | 0.763 | 1.000 | 0.865 | 0.500 | 75.68 |
|  | Special characters | 0.000 | 0.000 | 0.000 | 0.762 | 0.998 | 0.864 | 0.606 | 75.53 |
|  | All tags | 0.689 | 0.503 | 0.576 | 0.857 | 0.926 | 0.890 | 0.717 | 82.33 |
|  | First and last POS | 0.000 | 0.000 | 0.000 | 0.763 | 1.000 | 0.865 | 0.500 | 75.68 |
|  | Metadata (MD) | 0.854 | 0.843 | 0.847 | 0.951 | 0.954 | 0.953 | 0.967 | 92.60 |
|  | Function words | 0.579 | 0.497 | 0.530 | 0.851 | 0.887 | 0.868 | 0.845 | 79.23 |
|  | Combined(SW, MD) | 0.978 | 0.871 | 0.021 | 0.962 | 0.994 | 0.977 | 0.993 | 96.45 |
| DS5 | URL | 0.956 | 0.144 | 0.248 | 0.883 | 0.999 | 0.937 | 0.571 | 88.43 |
|  | Spam words (SW) | 0.922 | 0.757 | 0.831 | 0.964 | 0.990 | 0.977 | 0.959 | 95.89 |
|  | Emotion symbols | 0.000 | 0.000 | 0.000 | 0.866 | 1.000 | 0.928 | 0.500 | 86.60 |
|  | Special characters | 0.000 | 0.000 | 0.000 | 0.866 | 1.000 | 0.928 | 0.399 | 86.60 |
|  | All tags | 0.587 | 0.162 | 0.254 | 0.883 | 0.982 | 0.930 | 0.541 | 87.17 |
|  | First and last POS | 0.000 | 0.000 | 0.000 | 0.866 | 1.000 | 0.928 | 0.500 | 86.60 |
|  | Metadata (MD) | 0.712 | 0.456 | 0.554 | 0.920 | 0.972 | 0.945 | 0.887 | 90.22 |
|  | Function words | 0.000 | 0.000 | 0.000 | 0.866 | 1.000 | 0.928 | 0.487 | 86.60 |
|  | Combined(SW, MD) | 0.914 | 0.775 | 0.838 | 0.966 | 0.989 | 0.977 | 0.973 | 96.02 |

TABLE 12

Naïve Bayes classification results

| Dataset | Feature Set | Spam PRE | REC | F | Ham PRE | REC | F | Acc | AUC |
|---|---|---|---|---|---|---|---|---|---|
| DS4 | URL | 0.961 | 0.140 | 0.240 | 0.789 | 0.998 | 0.881 | 0.567 | 78.85 |
|  | Spam words (SW) | 0.935 | 0.923 | 0.928 | 0.976 | 0.979 | 0.978 | 0.983 | 96.60 |
|  | Emotion symbols | 0.240 | 1.000 | 0.387 | 0.600 | 0.013 | 0.025 | 0.500 | 25.30 |
|  | Special characters | 0.525 | 0.221 | 0.305 | 0.795 | 0.937 | 0.860 | 0.753 | 76.36 |
|  | All tags | 0.553 | 0.610 | 0.556 | 0.847 | 0.788 | 0.787 | 0.731 | 74.31 |
|  | First and last POS | 0.615 | 0.419 | 0.497 | 0.836 | 0.920 | 0.876 | 0.801 | 79.83 |
|  | Metadata (MD) | 0.653 | 0.894 | 0.752 | 0.963 | 0.847 | 0.901 | 0.948 | 85.88 |
|  | Function words | 0.571 | 0.545 | 0.556 | 0.860 | 0.870 | 0.865 | 0.848 | 79.15 |
|  | Combined(SW, MD) | 0.855 | 0.949 | 0.899 | 0.984 | 0.949 | 0.966 | 0.083 | 94.79 |
| DS5 | URL | 0.948 | 0.143 | 0.248 | 0.883 | 0.999 | 0.937 | 0.500 | 88.43 |
|  | Spam words (SW) | 0.737 | 0.863 | 0.794 | 0.978 | 0.952 | 0.965 | 0.960 | 94.03 |
|  | Emotion symbols | 0.141 | 1.000 | 0.247 | 1.000 | 0.059 | 0.111 | 0.529 | 18.50 |
|  | Special characters | 0.080 | 0.012 | 0.021 | 0.866 | 0.985 | 0.922 | 0.731 | 85.47 |
|  | All tags | 0.446 | 0.498 | 0.470 | 0.921 | 0.904 | 0.912 | 0.712 | 84.95 |
|  | First and last POS | 0.692 | 0.169 | 0.270 | 0.885 | 0.988 | 0.934 | 0.767 | 87.82 |
|  | Metadata (MD) | 0.548 | 0.809 | 0.653 | 0.968 | 0.896 | 0.931 | 0.925 | 88.45 |

TABLE 12-continued

Naïve Bayes classification results

| Dataset | Feature Set | Spam | | | Ham | | | Acc | AUC |
|---|---|---|---|---|---|---|---|---|---|
| | | PRE | REC | F | PRE | REC | F | | |
| | Function words | 0.000 | 0.000 | 0.000 | 0.866 | 1.000 | 0.928 | 0.822 | 88.60 |
| | Combined(SW, MD) | 0.835 | 0.863 | 0.848 | 0.979 | 0.973 | 0.976 | 0.907 | 95.80 |

In order to demonstrate the effectiveness of the proposed DCA-based algorithm for multimodal mobile communication spam detection, the experiment was carried out again for both datasets. Using the best values for DCA parameters listed in Table 4, the corresponding performance is shown in Table 13 along with the best results obtained for SVM and NB. It can be observed that significant improvement is achieved by applying the proposed approach yet with only two most relevant feature sets.

TABLE 13

Comparison of DCA with best performance of SVM and NB

| Dataset | Classifier | Spam | | | Ham | | | AUC | ACC |
|---|---|---|---|---|---|---|---|---|---|
| | | PRE | REC | F | PRE | REC | F | | |
| DS4 | Proposed | 1.000 | 0.991 | 0.995 | 0.997 | 1.000 | 0.999 | 0.999 | 99.77 |
| | SVM | 0.978 | 0.871 | 0.921 | 0.962 | 0.994 | 0.977 | 0.993 | 96.45 |
| | NB | 0.855 | 0.949 | 0.899 | 0.984 | 0.949 | 0.966 | 0.983 | 94.79 |
| DS5 | Proposed | 1.000 | 0.996 | 0.908 | 0.999 | 1.000 | 1.000 | 0.999 | 99.95 |
| | SVM | 0.914 | 0.775 | 0.838 | 0.966 | 0.989 | 0.977 | 0.973 | 96.02 |
| | NB | 0.835 | 0.863 | 0.848 | 0.979 | 0.973 | 0.976 | 0.967 | 95.86 |

Figure 7:
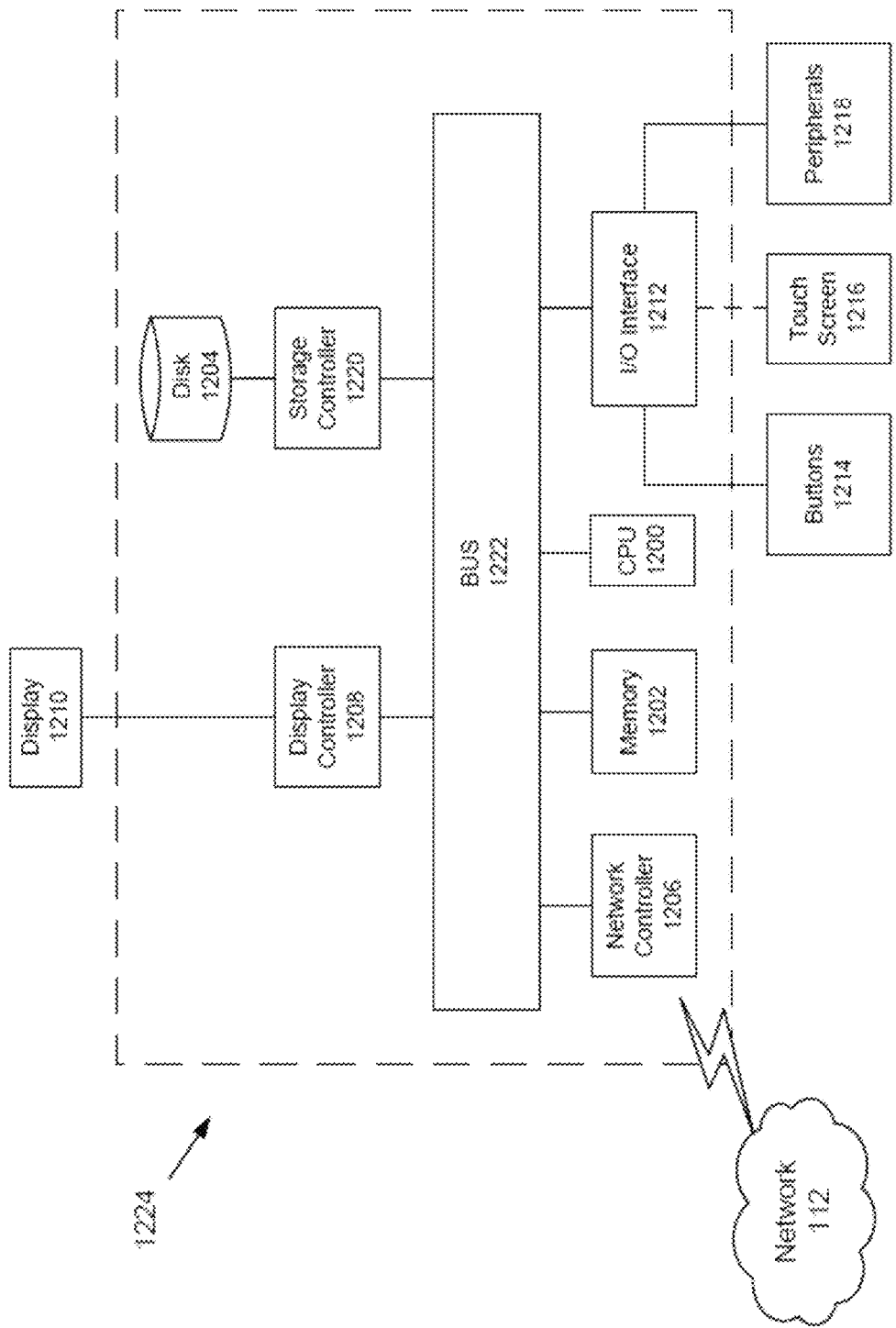
FIG. 7 shows a block diagram of a computer according to embodiments of the present disclosure.

Next, a hardware description of the computer or mobile device according to exemplary embodiments is described with reference to FIG. 7. In FIG. 7, a computer or mobile device 1224 includes a CPU 1200 which performs the processes described herein. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer or mobile device 1224 communicates, such as a server or another computer.

Further, the claimed advancements may be provided as a utility application, background daemon, or component of an operating system, or combination thereof, executing in conjunction with CPU 1200 and an operating system such as Microsoft® Windows®, UNIX®, Oracle@ Solaris, LINUX®, Apple macOS® and other systems known to those skilled in the art.

In order to achieve the computer or mobile device 1224, the hardware elements may be realized by various circuitry elements, known to those skilled in the art. For example, CPU 1200 may be a Xenon® or Core® processor from Intel Corporation of America or an Opteron® processor from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The computer or mobile device 1224 in FIG. 7 also includes a network controller 1206, such as an Intel Ethernet PRO network interface card from Intel Corporation of America, for interfacing with network 112. As can be appreciated, the network 112 can be a public network, such as the Internet, or a private network such as LAN or WAN network, or any combination thereof and can also include PSTN or ISDN sub-networks. The network 112 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer or mobile device 1224 further includes a display controller 1208, such as a NVIDIA® GeForce® GTX or Quadro® graphics adaptor from NVIDIA Corporation of America for interfacing with display 1210, such as a Hewlett Packard® HPL2445w LCD monitor. A general purpose I/O interface 1212 interfaces with a keyboard and/or mouse 1214 and/or a touch screen panel 1216 on or separate from display 1210. General purpose I/O interface also connects to a variety of peripherals 1218 including printers and scanners, such as an OfficeJet® or DeskJet® from Hewlett Packard®.

The general purpose storage controller 1220 connects the storage medium disk 1204 with communication bus 1222, which may be an ISA, EISA, VESA, PCI, or similar, for interconnecting all of the components of the computer or mobile device 1224. A description of the general features and functionality of the display 1210, keyboard and/or mouse 1214, as well as the display controller 1208, storage controller 1220, network controller 1206, and general purpose I/O interface 1212 is omitted herein for brevity as these features are known.

With the evolution of mobile technology and the increased dependence on smart devices, the number of spam messages is growing fast. Spam is not only annoying but it can be a vehicle for severe security breaches and information leakage as well. To control this problem, we analyzed and evaluated several feature sets, which can be easily extracted from the received messages, using two machine-learning algorithms. Moreover, we developed a unified framework for mobile spam filtering based on DCA by fusing outputs from two machine-learning algorithms. To address the requirement of limited resource mobile devices, we also explored the potential of the proposed approach as a lightweight solution with reduced feature sets. Using five benchmark datasets, the empirical results showed remarkable improvement is achievable over base classifiers (with close to 100% accuracy).

The invention claimed is:

1. A method for filtering textual multimodal messages in the form of short messages at a mobile device, comprising:
   receiving an electronic message at the mobile device, the electronic message being a short message;
   enriching, via processing circuitry of the mobile device, the electronic message;
   extracting, via the processing circuitry, one or more features from the electronic message;
   generating, via the processing circuitry, according to an algorithm, dendritic cell signals based on the one or more features extracted from the electronic message;
   subjecting, via the processing circuitry, the dendritic cell signals and the electronic message to a dendritic cell algorithm including one or more dendritic cells;
   determining, via processing circuitry, a maturity of the one or more dendritic cells; and
   classifying, via processing circuitry, the electronic message as spam based upon the maturity of the one or more dendritic cells,
   wherein the one or more features includes one or more of existence of JavaScript, characteristics of a recipient address field, characteristics of a subject field, and a domain from which the electronic message was sent,
   wherein the one or more features extracted from the electronic message for said generating dendritic cell signals include a feature vector representing the electronic message,
   wherein said generating dendritic cell signals according to the algorithm includes:
   processing of the feature vector representing the electronic message as an input to each of a Naïve Bays (NB) algorithm and a Support Vector Machine (SVM) algorithm to generate a first decision on the classification of the electronic message with a first confidence level for the Naïve Bays (NB) algorithm and a second decision on the classification of the electronic message with a second confidence level for the Support Vector Machine (SVM) algorithm, and
   performing a comparison of the first and second decisions on the classification of the electronic message to determine whether or not the first decision on the classification of the electronic message for the Naïve Bays (NB) algorithm matches the second decision on the classification of the electronic message for the Support Vector Machine (SVM) algorithm,
   wherein when the first decision on the classification of the electronic message does not match the second decision on the classification of the electronic message, the generated dendritic cell signal is a Danger signal according to an average confidence level of the first decision on the classification of the electronic message for the Naïve Bays (NB) algorithm and the second decision on the classification of the electronic message for the Support Vector Machine (SVM) algorithm,
   wherein when the first decision on the classification of the electronic message matches the second decision on the classification of the electronic message and the first and second decisions on the classification indicate "spam," then the generated dendritic cell signal is a PAMP signal according to a first maximum confidence level of the first decision on the classification of the electronic message for the Naïve Bays (NB) algorithm and the second decision on the classification of the electronic message for the Support Vector Machine (SVM) algorithm, and
   wherein when the first decision on the classification of the electronic message matches the second decision on the classification of the electronic message and the first and second decisions on the classification indicate "non-spam," then the generated dendritic cell signal is a Safe signal according to a second maximum confidence level of the first decision on the classification of the electronic message for the Naïve Bays (NB) algorithm and the second decision on the classification of the electronic message for the Support Vector Machine (SVM) algorithm.

2. The method of claim 1, wherein the enriching includes adding additional information to the electronic message before extracting the one or more features from the content of the electronic message.

3. The method of claim 2, wherein adding additional information to the electronic message includes adding semantic information to the content of the electronic message.

4. The method of claim 1, wherein the one or more features includes two or more of existence of JavaScript, characteristics of a recipient address field, characteristics of a subject field, and a domain from which the electronic message was sent.

5. The method of claim 1, wherein the one or more features includes three or more of existence of JavaScript, characteristics of a recipient address field, characteristics of a subject field, and a domain from which the electronic message was sent.

6. The method of claim 5, wherein the electronic message is an instant message.

7. A mobile device configured to filter textual multimodal messages in the form of short messages at a mobile device, comprising:
   a memory; and
   a processor operatively coupled to the memory and configured to:
   receive an electronic message, the electronic message being a short message;
   enrich the electronic message;
   extract one or more features from the electronic message;
   generate dendritic cell signals based on the one or more features extracted from the electronic message according to an algorithm;
   subject, via the processing circuitry, the dendritic cell signals and the electronic message to a dendritic cell algorithm including one or more dendritic cells;
   determine a maturity of the one or more dendritic cells; and
   classify the electronic message as spam based upon the maturity of the one or more dendritic cells,
   wherein the one or more features includes one or more of existence of JavaScript, characteristics of a recipient address field, characteristics of a subject field, and a domain from which the electronic message was sent, wherein the one or more features extracted from the electronic message for the generation of the dendritic cell signals include a feature vector representing the electronic message, wherein said generating dendritic cell signals according to the algorithm includes:

processing of the feature vector representing the electronic message as an input to each of a Naïve Bays (NB) algorithm and a Support Vector Machine (SVM) algorithm to generate a first decision on the classification of the electronic message with a first confidence level for the Naïve Bays (NB) algorithm and a second decision on the classification of the electronic message with a second confidence level for the Support Vector Machine (SVM) algorithm, and performing a comparison of the first and second decisions on the classification of the electronic message to determine whether or not the first decision on the classification of the electronic message for the Naïve Bays (NB) algorithm matches the second decision on the classification of the electronic message for the Support Vector Machine (SVM) algorithm, wherein when the first decision on the classification of the electronic message does not match the second decision on the classification of the electronic message, the generated dendritic cell signal is a Danger signal according to an average confidence level of the first decision on the classification of the electronic message for the Naïve Bays (NB) algorithm and the second decision on the classification of the electronic message for the Support Vector Machine (SVM) algorithm, wherein when the first decision on the classification of the electronic message matches the second decision on the classification of the electronic message and the first and second decisions on the classification indicate "spam," then the generated dendritic cell signal is a PAMP signal according to a first maximum confidence level of the first decision on the classification of the electronic message for the Naïve Bays (NB) algorithm and the second decision on the classification of the electronic message for the Support Vector Machine (SVM) algorithm, and wherein when the first decision on the classification of the electronic message matches the second decision on the classification of the electronic message and the first and second decisions on the classification indicate "non-spam," then the generated dendritic cell signal is a Safe signal according to a second maximum confidence level of the first decision on the classification of the electronic message for the Naïve Bays (NB) algorithm and the second decision on the classification of the electronic message for the Support Vector Machine (SVM) algorithm.

8. The apparatus of claim 7, wherein the processing circuitry is configured to add additional information to the electronic message before extracting the one or more features from the content of the electronic message.

9. The apparatus of claim 8, wherein the processing circuitry is configured to add semantic information to the electronic message.

10. The apparatus of claim 7, wherein the one or more features includes two or more of existence of JavaScript, characteristics of a recipient address field, characteristics of a subject field, and a domain from which the electronic message was sent.

11. The apparatus of claim 7, wherein the one or more features includes three or more of existence of JavaScript, characteristics of a recipient address field, characteristics of a subject field, and a domain from which the electronic message was sent.

12. The apparatus of claim 11, wherein the electronic message is an instant message.

13. A non-transitory computer readable medium storing instructions which when executed by a computer of a mobile device cause the computer to execute a process for filtering textual multimodal messages in the form of short messages at a mobile device, the process comprising:

receiving an electronic message at the mobile device, the electronic message being a short message;

enriching the electronic message using the mobile device;

extracting one or more features from the electronic message using the mobile device;

generating dendritic cell signals based on the one or more features extracted from the electronic message using the mobile device according to an algorithm;

subjecting the dendritic cell signals and the electronic message to a dendritic cell algorithm including one or more dendritic cells using the mobile device;

determining a maturity of the one or more dendritic cells using the mobile device; and classifying the electronic message as spam based upon the maturity of the one or more dendritic cells using the mobile device, wherein the one or more features includes one or more of existence of JavaScript, characteristics of a recipient address field, characteristics of a subject field, and a domain from which the electronic message was sent, wherein the one or more features extracted from the electronic message for said generating dendritic cell signals include a feature vector representing the electronic message, wherein said generating dendritic cell signals according to the algorithm includes:

processing of the feature vector representing the electronic message as an input to each of a Naïve Bays (NB) algorithm and a Support Vector Machine (SVM) algorithm to generate a first decision on the classification of the electronic message with a first confidence level for the Naïve Bays (NB) algorithm and a second decision on the classification of the electronic message with a second confidence level for the Support Vector Machine (SVM) algorithm, and performing a comparison of the first and second decisions on the classification of the electronic message to determine whether or not the first decision on the classification of the electronic message for the Naïve Bays (NB) algorithm matches the second decision on the classification of the electronic message for the Support Vector Machine (SVM) algorithm, wherein when the first decision on the classification of the electronic message does not match the second decision on the classification of the electronic message, the generated dendritic cell signal is a Danger signal according to an average confidence level of the first decision on the classification of the electronic message for the Naïve Bays (NB) algorithm and the second decision on the classification of the electronic message for the Support Vector Machine (SVM) algorithm, wherein when the first decision on the classification of the electronic message matches the second decision on the classification of the electronic message and the first and second decisions on the classification indicate "spam," then the generated dendritic cell signal is a PAMP signal according to a first maximum confidence level of the first decision on the classification of the electronic message for the Naïve Bays (NB) algorithm and the second decision on the classification of the electronic message for the Support Vector Machine (SVM) algorithm, and wherein when the first decision on the classification of the electronic message matches the second decision on the classification of the electronic message and the first and second decisions on the classification indicate "non-spam," then the generated dendritic cell signal is a Safe signal according to a second maximum confidence level of the first decision on the classification of the electronic message for the Naïve Bays (NB) algorithm and the second decision on the classification of the electronic message for the Support Vector Machine (SVM) algorithm.

14. The non-transitory computer readable medium of claim 13, wherein the enriching includes adding additional information to the electronic message before extracting the one or more features from the content of the electronic message.

15. The non-transitory computer readable medium of claim 14, wherein adding additional information to the electronic message includes adding semantic information to the content of the electronic message.

16. The non-transitory computer readable medium of claim 13, wherein the one or more features includes two or more of existence of JavaScript, characteristics of a recipient address field, characteristics of a subject field, and a domain from which the electronic message was sent.

17. The non-transitory computer readable medium of claim 13, wherein the one or more features includes three or more of existence of JavaScript, characteristics of a recipient address field, characteristics of a subject field, and a domain from which the electronic message was sent.

* * * * *